Patented Apr. 20, 1926.

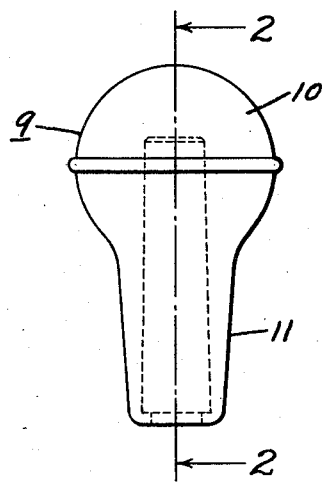
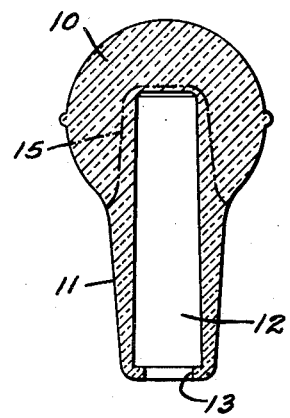
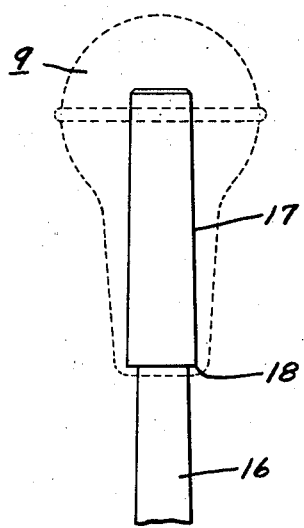

1,582,021

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

MOLDED RUBBER HAND KNOB.

Application filed September 11, 1925. Serial No. 55,738.

*To all whom it may concern:*

Be it known that I, HARVEY D. GEYER, a citizen of the United States of America, residing at Dayton, county of Montgomery, and State of Ohio, have invented certain new and useful Improvements in Molded Rubber Hand Knobs, of which the following is a full, clear, and exact description.

This invention relates to molded rubber articles and provisions for attaching the same to a supporting shank, and has special reference to a molded rubber hand knob attached to the upper end of an automobile gear shift lever or similar lever.

Heretofore rubber hand knobs have been made with a screw threaded metal insert molded in place therein and such hand knobs are secured to the lever by screwing the metal insert upon the correspondingly threaded upper end of the lever. This method of course requires machining and threading of the upper end of the lever as well as threading the metal insert, and the difficulty and expense of molding the metal insert in place in the rubber knob.

Now this invention provides a molded rubber hand knob which requires no such machined or threaded parts and which may be securely attached to the lever simply by pressing it down over the end of said lever. The portion of the hand knob ordinarily grasped by the hand is made of hard vulcanized rubber and hence will last indefinitely and will take a bright polish while the portion of the knob which grips the lever is of yieldable rubber and hence may be suitably secured to the lever simply by pressing it down over the end of the lever, which fits within a recess in the knob.

Further objects and advantages of the present invention will be apparent from the following description, reference being had to the accompanying drawings, wherein a preferred form of embodiment of the present invention is clearly shown.

In the drawings:

Fig. 1 is a side elevation of a gear shift hand knob made according to this invention.

Fig. 2 is a section on line 2—2 of Fig. 1.

Fig. 3 is a phantom view of the hand knob assembled upon the lever.

The same reference characters refer to the same parts throughout the several views.

The hand knob 9 comprises a ball portion 10 having a projecting portion 11 molded integral therewith. The slightly tapering recess 12 and annular flange 13 are formed by a suitable core placed in the mold in a manner well known to those skilled in the art.

When the uncured rubber compound is placed in the mold two kinds of compound are used, that forming the main ball portion 10 being of such consistency that it will vulcanize to hard rubber while that forming the portion 11 will vulcanize to flexible rubber during the same curing process to which the mold is later subjected. Preferably the line of division between the hard and the flexible rubber lies approximately along the dot and dash line 15 shown in Fig. 2.

The upper end of the gear shift lever 16 is provided with a slightly tapering head 17 having an abrupt shoulder 18 at its lower edge. The recess 12 is of such size that when the hand knob 9 is pressed down firmly over the head 17 the yielding rubber bordering on the recess 12 will grip the head 17 and thus retain the hand knob firmly in place. The annular flange 13 of flexible rubber of course yields sufficiently to permit the insertion of the enlarged head 17 into recess 12, and when the hand knob is pressed down to its final position the flange 13 snaps under the shoulder 18 and thus aids in retaining the hand knob in place upon the lever 16.

The ball portion 10 being of hard rubber will form a suitable hand grip and will take a high polish, while the yieldable portion 11 serves to firmly grip the head 17. Obviously the head 17 does not have to be machined to exact dimensions, drop forged dimensions being sufficiently accurate.

While the form of embodiment of the present invention as herein disclosed, constitutes a preferred form, it is to be understood that other forms might be adopted, all coming within the scope of the claims which follow.

What is claimed is as follows:

1. A molded rubber composition hand knob having a projecting portion integral therewith, said projecting portion having a recess therein and adapted to be slipped over the end of a supporting shank, the outer surface of said hand knob being of such rubber composition that it vulcanizes harder than the rubber composition lying adjacent said recess.

2. A molded rubber hand knob having a recessed projecting portion integral therewith adapted to fit over a supporting shank, the portion of said knob ordinarily grasped by the hand being of hard vulcanized rubber and said projecting portion being of yieldable vulcanized rubber.

3. A molded rubber hand knob having a recess therein adapted to fit over a supporting shank, the portion of said knob ordinarily grasped by the hand being of hard vulcanized rubber and the portion surrounding said recess being of yieldable vulcanized rubber.

4. In combination, a hand lever having a shoulder thereon near the end thereof, a molded rubber hand knob having a recess therein into which the end of said lever snugly fits, and a yieldable inturned flange on said rubber knob which engages said shoulder and aids in retaining said knob upon said lever.

In testimony whereof I hereto affix my signature.

HARVEY D. GEYER.